US011292529B2

(12) United States Patent
Migaki et al.

(10) Patent No.: US 11,292,529 B2
(45) Date of Patent: Apr. 5, 2022

(54) SIDE PART STRUCTURE OF VEHICLE

(71) Applicant: NISHIKAWA RUBBER CO., LTD., Hiroshima (JP)

(72) Inventors: Yusuke Migaki, Hiroshima (JP); Kousuke Mori, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 291 days.

(21) Appl. No.: 16/564,339

(22) Filed: Sep. 9, 2019

(65) Prior Publication Data

US 2020/0114977 A1    Apr. 16, 2020

(30) Foreign Application Priority Data

Sep. 10, 2018    (JP) .............................. JP2018-168736

(51) Int. Cl.
*B62D 25/16*    (2006.01)
*B60J 10/20*    (2016.01)

(52) U.S. Cl.
CPC ............ *B62D 25/165* (2013.01); *B60J 10/20* (2016.02)

(58) Field of Classification Search
CPC ........ B62D 25/165; B62D 25/18; B60J 10/20; B60J 10/45; B60J 10/80; B60J 10/84; B60J 10/85
USPC ..................................................... 296/146.9
See application file for complete search history.

(56) References Cited

U.S. PATENT DOCUMENTS

| 2,313,812 | A | * | 3/1943 | Duffy | .................... E04F 11/163 |
| | | | | | 296/146.9 |
| 6,138,415 | A | * | 10/2000 | Ohtsu | ..................... B60R 13/04 |
| | | | | | 296/146.9 |
| 8,172,306 | B2 | * | 5/2012 | Kishi | ................... B62D 25/161 |
| | | | | | 296/146.9 |
| 8,313,135 | B2 | * | 11/2012 | Iida | ......................... B60J 10/84 |
| | | | | | 296/146.9 |
| 2020/0031404 | A1 | * | 1/2020 | Siegel | ..................... B62D 25/18 |

FOREIGN PATENT DOCUMENTS

| DE | 202012104401 | U1 | * | 2/2014 | ............. B60J 10/80 |
| GB | 622038 | A | * | 4/1949 | ............. B60J 10/20 |
| JP | 07101244 | A | * | 4/1995 | ............. B60J 10/30 |
| JP | 2014180921 | A | | 9/2014 | |
| KR | 2005005332 | A | * | 1/2005 | |

* cited by examiner

*Primary Examiner* — Hilary L Gutman
(74) *Attorney, Agent, or Firm* — Holtz, Holtz & Volek PC

(57) ABSTRACT

A side part structure of a vehicle includes a side door and a second seal member. The side door includes a lower end edge which substantially overlaps a wheel arch. The second seal member is configured to seal a gap between a wheel house and the side door. The side door includes a door garnish which faces an outer edge of the wheel house. The second seal member includes an installation base member and a lip integrally formed with the installation base member. The installation base member is configured to operably couple to the outer edge of the wheel house. The lip has a substantially tongue-shaped cross section in a width direction of the vehicle, and makes contact with the door garnish. The lip extends toward an outside in the width direction of the vehicle from a part on an outer side in a radial direction of the installation base member.

9 Claims, 5 Drawing Sheets

SIDE PART STRUCTURE OF VEHICLE

CROSS REFERENCE TO RELATED APPLICATION

This application claims the benefit under 35 USC § 119 of JP Patent Application JP 2018-168736 filed Sep. 10, 2018, the entire disclosure of which is incorporated herein by reference.

BACKGROUND INFORMATION

The present invention relates to a side part structure of a vehicle, and more particularly, to a seal member configured to operably couple to an edge of a wheel house, for example, wherein the seal member makes contact with a door garnish of a side door.

A traditional seal member for use on the vehicle including an automobile is provided between the side door and an automobile body to prevent entrance of rainwater or fine particles flung up by a rear wheel. The side door is on a side of the vehicle adjacent to the rear wheel.

In case a lower end edge of the side door of the vehicle substantially overlaps a wheel arch, the seal member configured to operably couple to the edge of the wheel house makes contact with the side door to prevent entrance of rainwater or fine particles flung up by a rear wheel. The wheel arch is a cutout which corresponds to an outer circumferential shape of the rear wheel. The wheel house faces the side door.

In case the seal member directly makes contact with an inner panel of the side door, the fine particles adhered to the seal member damage coating on the inner panel when opening or closing the side door. This configuration may degrade appearance of the side door or cause rust on the side door.

In this connection, Japanese unexamined Patent Application Publication No. 2014-180921 proposes a configuration that the seal member makes contact with a door garnish (arch molding) configured to operably couple to a lower part of the side door to prevent damage on the inner panel by the fine particles adhered to the seal member.

The seal member proposed in Japanese unexamined Patent Application Publication No. 2014-180921 is formed by integrally forming an installation base member configured to operably couple to the edge of the wheel house and a lip (seal member) which makes contact with the door garnish. The resultant seal member is not balanced in the amount of elastic deformation when subjected to pressure from the side door. Specifically, the amount of the elastic deformation tends to be less on a part of the lip close to a base than a part close to a top end.

As the vehicle is driven on a snowy road, ice and snow flung up by the rear wheel adheres around the base of the lip. Accordingly, even in case the seal member elastically deforms by opening or closing the side door, the ice and snow does not come off the part close to the base of the lip of the seal member and tends to accumulate.

In addition, as the side door is closed powerfully, with the ice and snow accumulated on the base of the lip or with the accumulated ice and snow frozen, the ice and snow accumulated around the base of the lip presses the door garnish toward an outside in a width direction of the vehicle. With this configuration, the door garnish may deform to rise from the side door, appearance on the side surface of the vehicle may degrade, and the door garnish may be damaged.

Accordingly, an object of the present invention is to provide the side part structure of the vehicle capable of controlling accumulation of the ice and snow on the seal member configured to operably couple to the edge of the wheel house and preventing degradation in appearance of the side surface of the vehicle and damage on the door garnish.

SUMMARY

In order to achieve the above-mentioned object, according to one aspect of the invention, a side part structure of a vehicle is provided, the structure including a side door and a seal member. The side door is configured to operably couple to an automobile body openably, and includes a lower end edge which substantially overlaps a wheel arch. The wheel arch is a cutout which corresponds to an outer circumferential shape of a rear wheel. The seal member is configured to seal a gap between a wheel house and the side door. The wheel house is configured to cover the rear wheel. The side door includes a door garnish which faces an edge of the wheel house in a width direction of the vehicle. The seal member includes an installation base member and a lip integrally formed with the installation base member. The installation base member is configured to operably couple to the edge of the wheel house. The lip has elasticity, has a substantially tongue-shaped cross section in the width direction of the vehicle, and makes contact with the door garnish. Under a condition that a radial direction away from a center of the rear wheel is an outer side in the radial direction, the lip in cross section along a width direction of the vehicle extends toward the door garnish on an outside in a width direction of the vehicle from a part on the outer side in the radial direction of the installation base member.

As compared with a lip which extends from a part on an inner side in the radial direction, which is opposite from the part on the outer side in the radial direction, this configuration elongates a distance between the center of the rear wheel and a base of the lip.

In other words, the base of the lip of the side part structure according to the present invention of the vehicle is further from the center of the rear wheel than the lip which extends from the part on the inner side in the radial direction of the installation base member.

The side part structure according to the present invention of the vehicle prevents ice and snow flung up by the rear wheel from reaching the part close to the base of the lip, and controls accumulation on the part close to the base of the lip.

Even in case the side door is closed powerfully, this configuration does not allow the ice and snow on the part close to the base of the lip to press the door garnish toward the outside in the width direction of the vehicle.

The side part structure according to the present invention of the vehicle controls accumulation of the ice and snow on the seal member configured to operably couple to the edge of the wheel house. Accordingly, the side part structure according to the present invention of the vehicle prevents degradation in appearance of the side surface of the vehicle caused by deformation of the door garnish rising from the side door and damage on the door garnish.

The present invention includes an embodiment that the lip of the seal member includes a body and an extension integrally formed with the body. The body extends from the part on the outer side in the radial direction of the installation base member relative to a lip intermediate part. The lip intermediate part makes contact with the door garnish. The extension extends toward the installation base member from the lip intermediate part. A top end of the extension may touch or be adjacent to the installation base member when the side door is in a closed position.

With this embodiment of the present invention, the extension of the lip closes an opening between the installation base member and the body of the lip when the side door is in the closed position.

With this configuration, the extension of the lip prevents ice and snow flung up by the rear wheel from entering a space between the installation base member and the body of the lip.

In addition, with this configuration, since ice and snow does not hamper elastic deformation of the body, the extension of the seal member is stably displaced when the side door is opened and closed. This configuration allows ice and snow adhering to the extension of the lip to easily peel off by opening and closing the side door.

Accordingly, the side part structure according to the present invention of the vehicle, with the extension added to the lip, further controls accumulation of ice and snow on the seal member configured to operably couple to the edge of the wheel house. The extension extends from the lip intermediate part which makes contact with the door garnish.

The present invention includes an embodiment that the lip of the seal member has a substantially tongue-shaped cross section which has a substantial V-shape with the lip intermediate part as an apex of the substantial V-shape when the side door is in an opened position.

This configuration certainly controls accumulation of ice and snow on the seal member configured to operably couple to the edge of the wheel house.

More specifically, in case the lip of the seal member in cross section along the width direction of the vehicle has the substantially tongue-shaped cross section which has a substantial arc-shape and protrudes toward the door garnish, a position of contact of the lip with the door garnish easily shifts owing to a change in an opening/closing angle of the side door.

With this configuration, a position of the extension of the lip relative to the installation base member is unstable when the side door is in the closed position. Also, with this configuration, the extension of the lip does not necessarily close the opening between the installation base member and the body of the lip when the side door is in the closed position.

On the other hand, the lip of the seal member of the present invention in cross section along the width direction of the vehicle has the substantially tongue-shaped cross section which has the substantial V-shape with the lip intermediate part as the apex of the substantial V-shape. The apex of the lip having the substantial V-shape stably makes contact with the door garnish regardless of the change in the opening/closing angle of the side door.

With this configuration, as a pressing load of the door garnish acts on the lip of the seal member, the extension of the lip is displaced to rotate toward an inside in the width direction of the vehicle with the part close to the base of the lip in cross section along the width direction of the vehicle as a center of rotation.

With this configuration, the position of the extension relative to the installation base member is stable when the side door is in the closed position. Accordingly, the extension of the lip certainly closes the opening between the installation base member and the body of the lip.

The side part structure according to the present invention of the vehicle, with the lip of the seal member in cross section having the substantially tongue-shaped cross section which has the substantial V-shape, certainly controls accumulation of ice and snow on the seal member configured to operably couple to the edge of the wheel house.

The present invention includes an embodiment that the lip of the seal member in cross section along the width direction of the vehicle includes a first lip layer and a second lip layer integrally formed with the first lip layer. The first lip layer makes contact with the door garnish. The second lip layer is closer to the inside in the width direction of the vehicle than the first lip layer and is higher in rigidity than the first lip layer. The second lip layer extends between a part of the body of the lip close to the lip intermediate part and the extension.

The second lip layer controls change in the position of the extension of the lip relative to the body. As the pressing load of the door garnish acts on the lip of the seal member, the extension of the lip is displaced while keeping an angle between the body and the extension in cross section along the width direction of the vehicle substantially stable.

With this configuration, the position of the extension relative to the installation base member is more stable when the side door is in the closed position. Accordingly, the extension of the lip more certainly closes the opening between the installation base member and the body of the lip.

The side part structure according to the present invention of the vehicle, with the lip of the seal member having the second lip layer which is higher in rigidity than the first lip layer on the inside in the width direction relative to the first lip layer, certainly controls accumulation of ice and snow on the seal member configured to operably couple to the edge of the wheel house.

The present invention includes an embodiment that a part of the installation base member of the seal member has a chamfering which has a substantial arc-shape. The part faces the top end of the extension of the lip in the width direction of the vehicle when the side door is in the opened position.

When the extension of the lip touches the installation base member, the extension of the lip is displaced along the chamfering on the installation base member.

This configuration prevents the extension of the lip from deform into an undesired shape when the extension of the lip makes contact with the installation base member. This configuration controls accumulation of ice and snow on the extension deformed into the undesired shape.

In addition, since the extension of the lip is displaced along the chamfering on the installation base member, the extension of the lip fully touches the installation base member without a space. With this configuration, the extension of the lip certainly closes the opening between the installation base member and the body of the lip.

The side part structure according to the present invention of the vehicle, with the chamfering on the installation base member, further controls accumulation of ice and snow on the seal member configured to operably couple to the edge of the wheel house. Also, the side part structure according to the present invention of the vehicle certainly prevents degradation in appearance of the side surface of the vehicle and damage on the door garnish.

The present invention provides the side part structure of the vehicle capable of controlling accumulation of ice and snow on the seal member configured to operably couple to the edge of the wheel house and preventing degradation in appearance of the side surface of the vehicle and damage on the door garnish.

DETAILED DESCRIPTION

Referring to drawings, a side part structure according to an embodiment of the present invention of a vehicle will be described.

A vehicle 1 according to the embodiment of the present invention includes a side door 6. A lower end edge of the side door 6 substantially overlaps a wheel arch 60. The wheel arch 60 is a cutout which corresponds to an outer circumferential shape of a rear wheel 2. Referring to FIG. 1 to FIG. 5, a side part structure according to the embodiment of the present invention of the vehicle 1 will be described.

Figure 1:
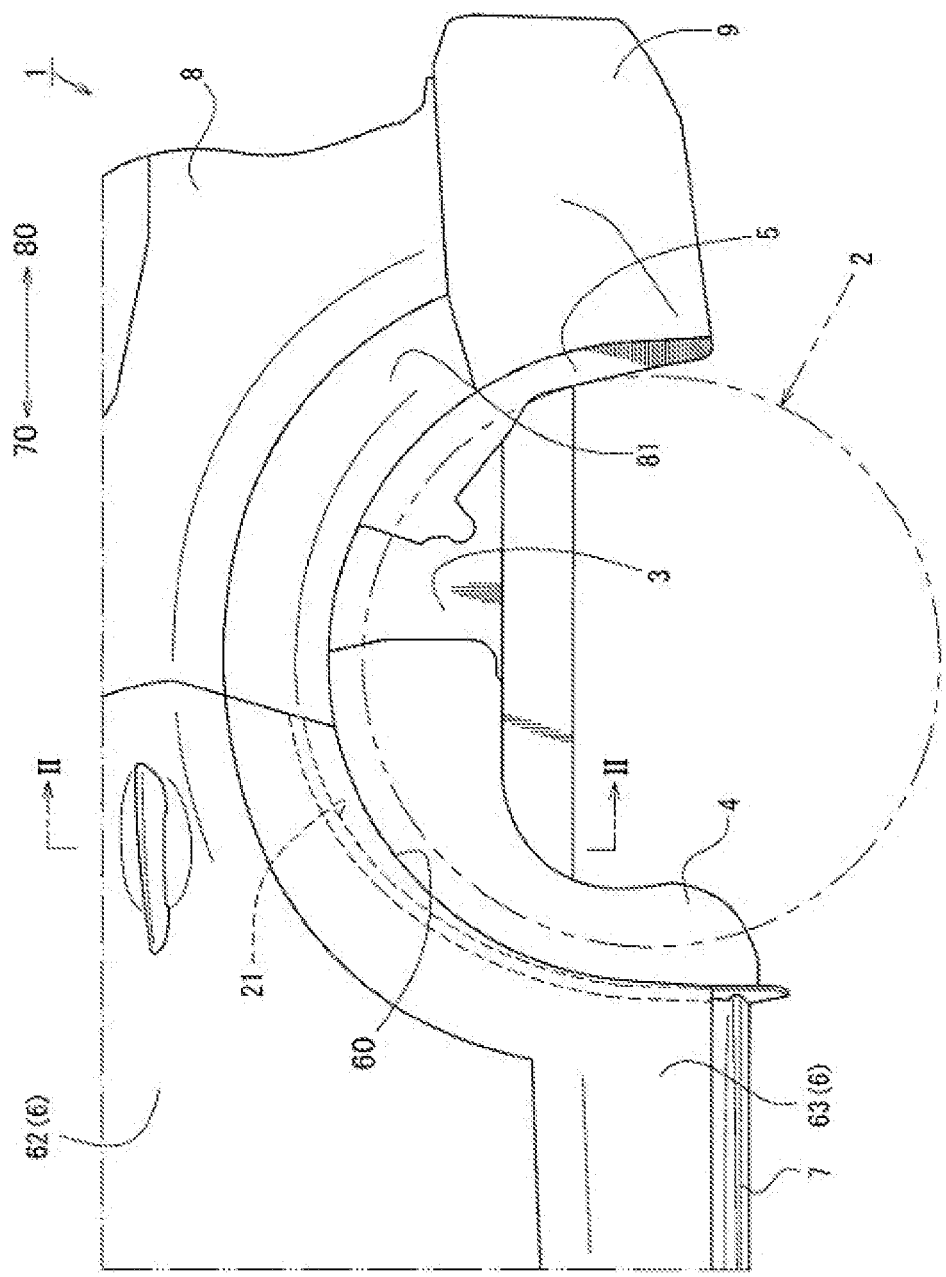
FIG. 1 is a left side view of a side part of a vehicle seen from a right side relative to the vehicle.
Figure 2:
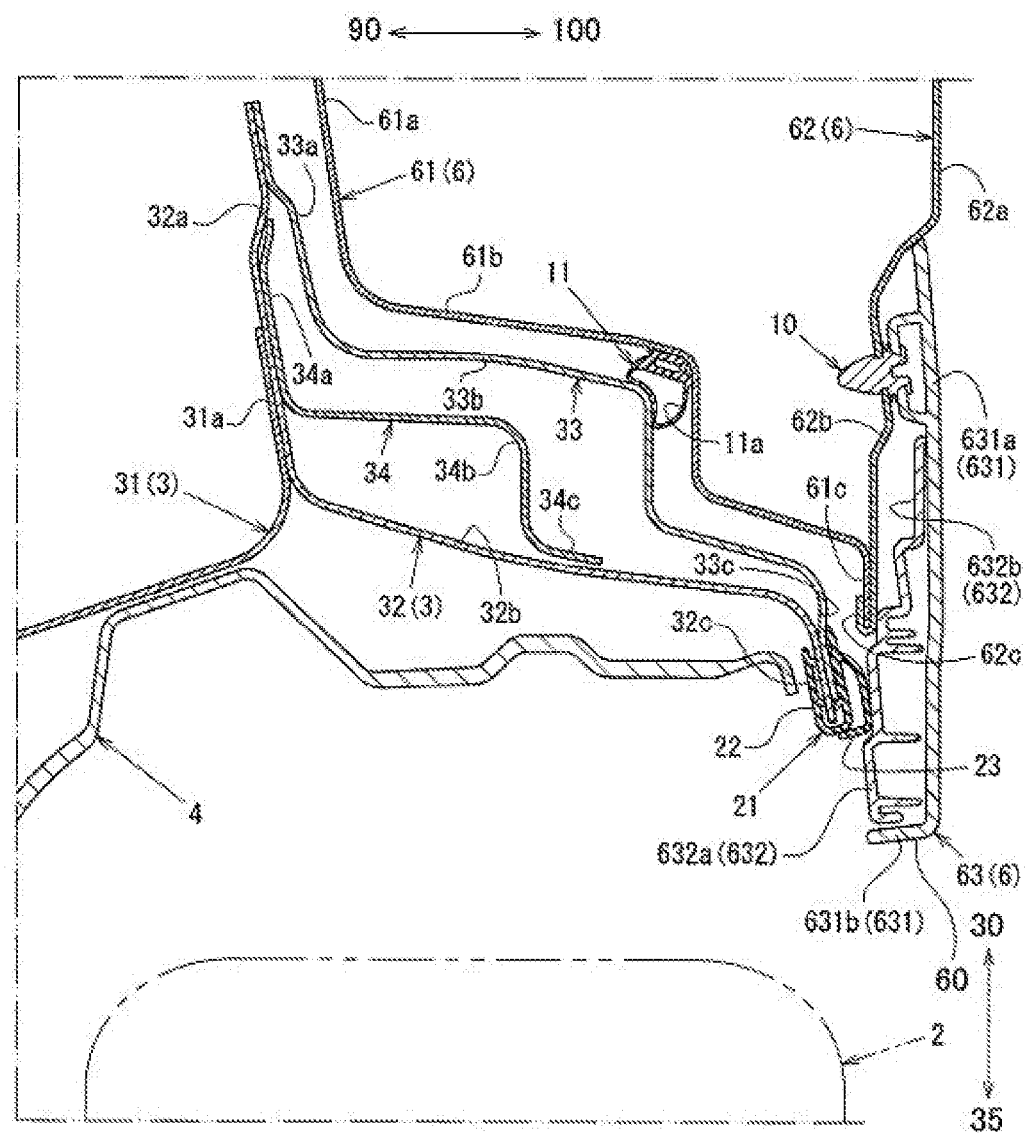
FIG. 2 is a cross-sectional view of the side part of the vehicle taken along line II-II of FIG. 1.
Figure 3:
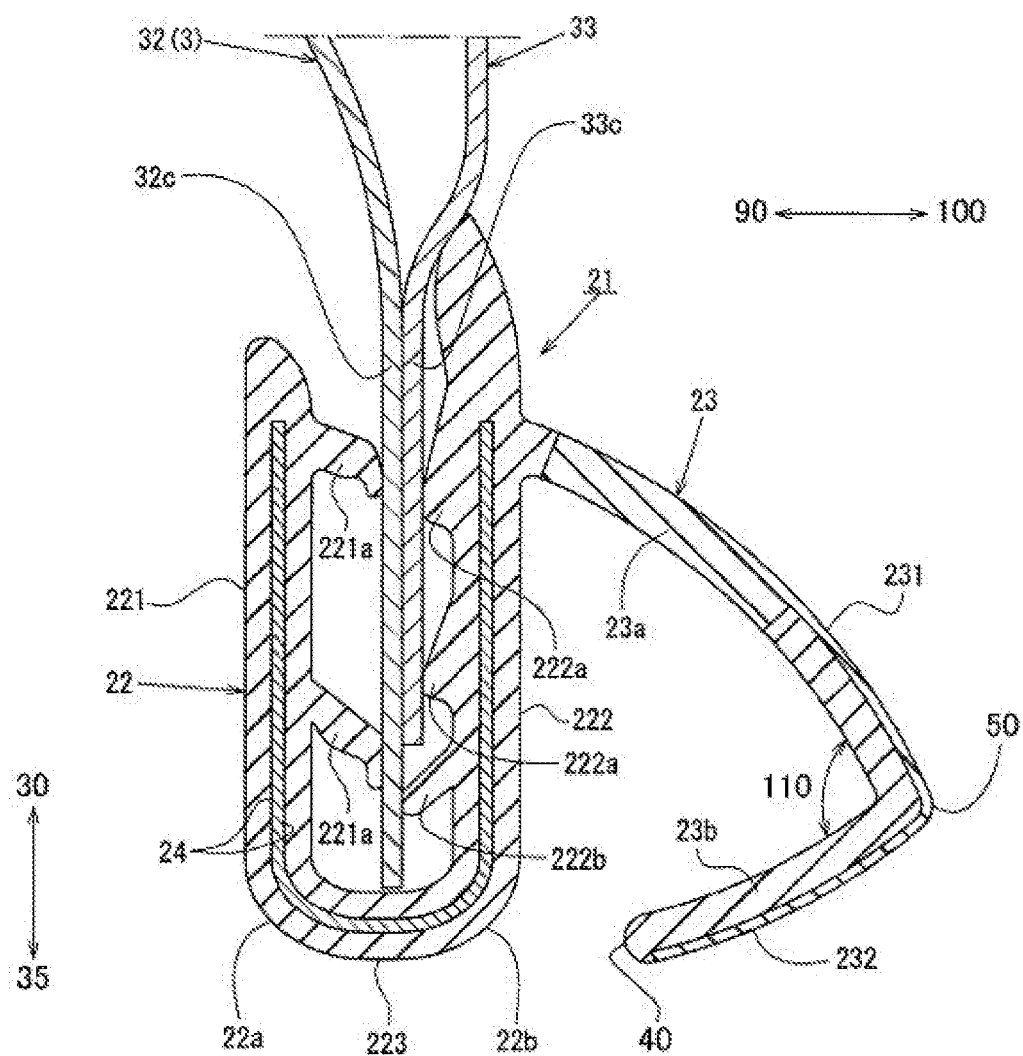
FIG. 3 is an enlarged cross-sectional view of an important part in the side part of the vehicle with a side door in an opened position.
Figure 4:
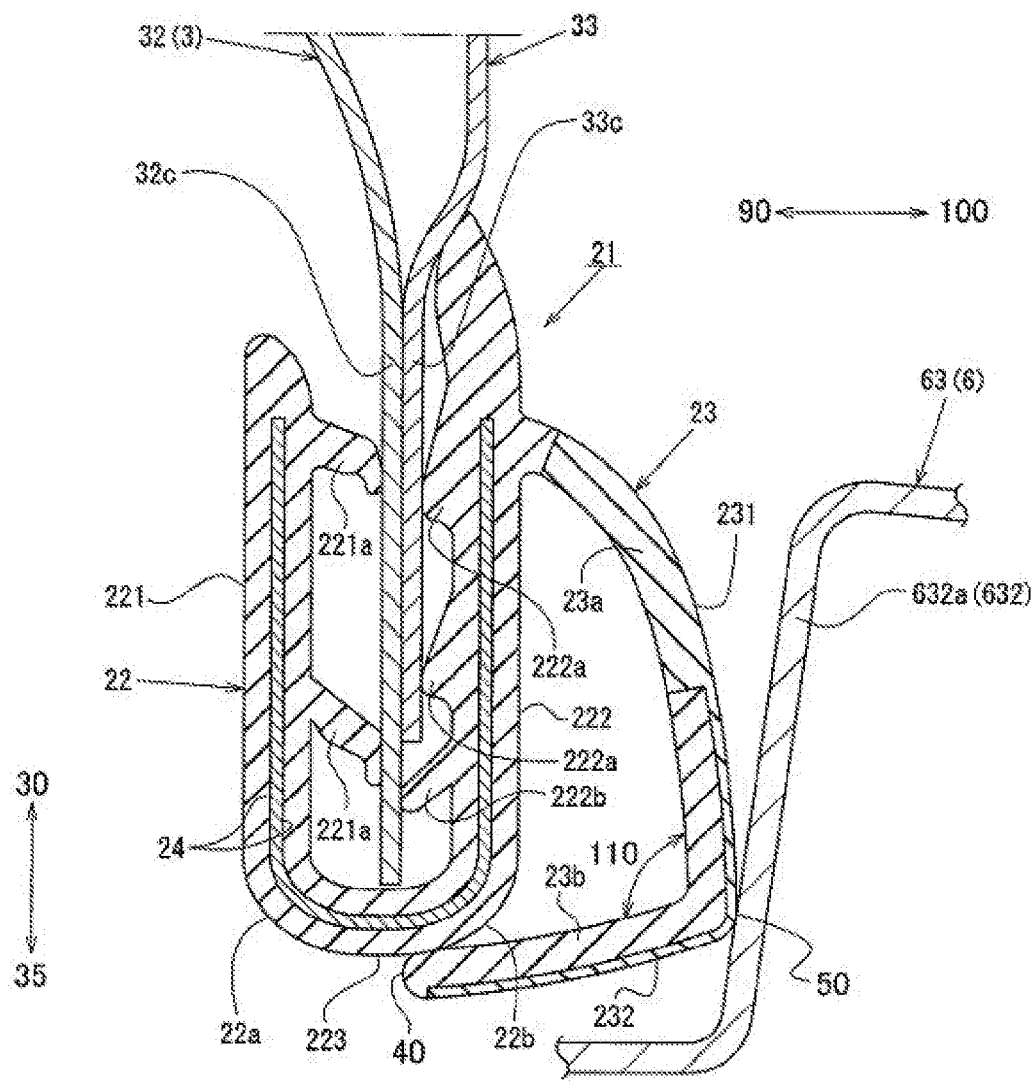
FIG. 4 is an enlarged cross-sectional view of an important part in the side part of the vehicle with the side door in a closed position.
Figure 5:
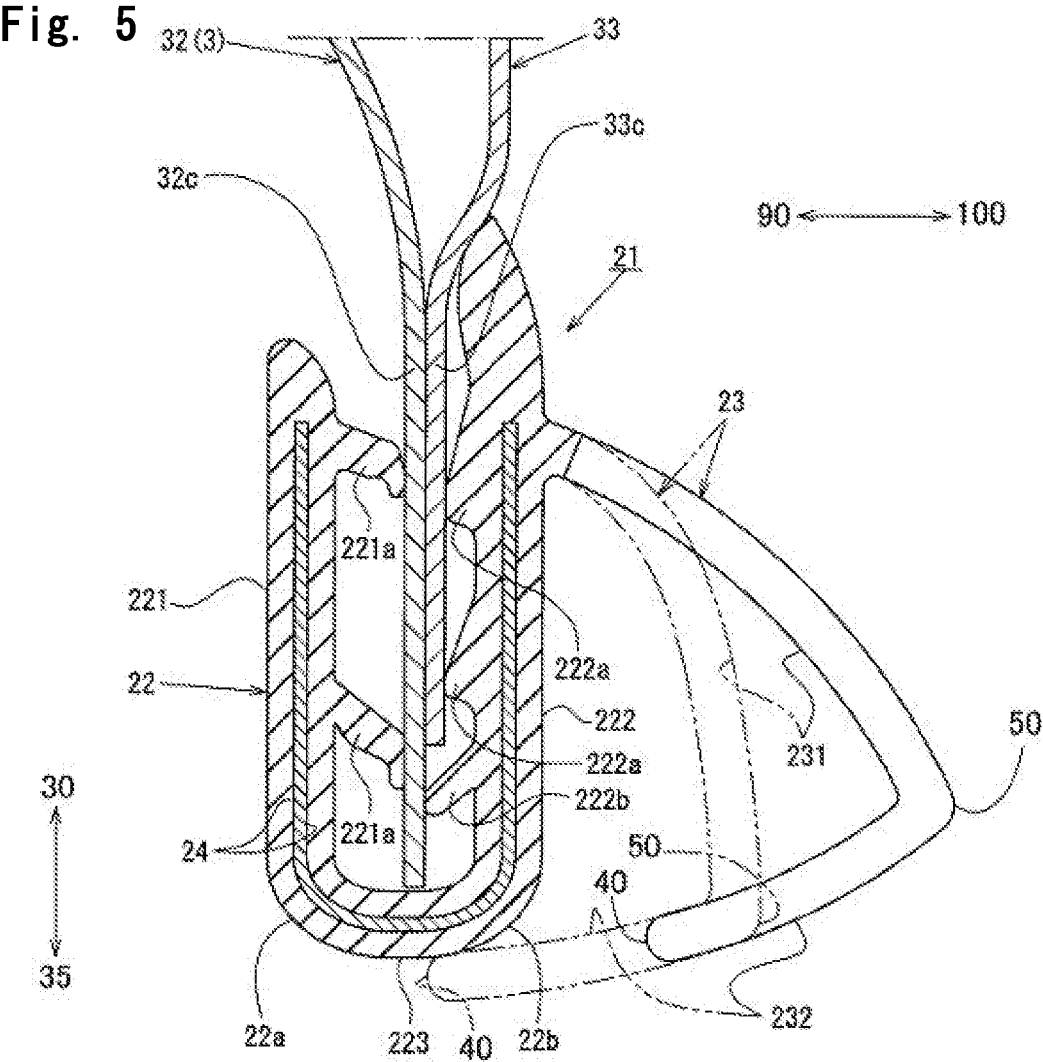
FIG. 5 is an explanatory diagram illustrating elastic deformation of a lip of a second seal member.

FIG. 1 is a left side view of the vehicle 1 seen from the right side relative to the vehicle 1. FIG. 2 is the cross-sectional view of the side part of the vehicle taken along line II-II of FIG. 1. FIG. 3 is the enlarged cross-sectional view of the important part in the side part of the vehicle with the side door 6 in the opened position. FIG. 4 is the enlarged cross-sectional view of the important part in the side part of the vehicle with the side door in the closed position. FIG. 5 is the explanatory diagram illustrating the elastic deformation of a lip 23 of a second seal member 21.

In order to clarify the diagram in FIG. 5, hatching for the lip 23 is omitted. In FIG. 5, the lip 23 with the side door 6 in the opened position is illustrated with a solid line, and the lip 23 with the side door 6 in the closed position is illustrated with a two-dot chain line.

In the Drawings, an arrow 70 and an arrow 80 illustrate a front direction and a rear direction, respectively. An arrow 90 and an arrow 100 illustrate an inside and an outside in a width direction of the vehicle 1, respectively.

Referring to FIG. 1 and FIG. 2, the vehicle 1 according to the embodiment of the present invention will be simply described.

As illustrated in FIG. 1, the vehicle 1 in side view includes the rear wheel 2 illustrated with the two-dot chain line, a wheel house 3 configured to cover an upper side of the rear wheel 2, a front wheel house cover 4 and a rear wheel house cover 5 in the wheel house 3, the side door 6 on a front side of the vehicle relative to the rear wheel 2, a side sill 7 which extends in a front and rear direction of the vehicle along a lower part of the side door 6, a rear fender 8 on a rear side of the side door 6, and a rear bumper 9 on a lower side of the rear fender 8.

The wheel house 3 has a substantially arc-shaped side view. A diameter of the wheel house 3 is slightly longer than a diameter of a wheel arch 60 (see FIG. 1). The wheel arch 60 is the cutout, which corresponds to the outer circumferential shape of the rear wheel 2, on the side part of the vehicle.

As illustrated in FIG. 1 and FIG. 2, the wheel house 3 includes a wheel house inner 31 on the inside in the width direction of the vehicle and a wheel house outer 32 closer to the outside in the width direction of the vehicle than the wheel house inner 31. The wheel house inner 31 and the wheel house outer 32 are joined with each other along the width direction of the vehicle and have a substantial dome-shape which protrudes toward the upper side of the vehicle.

As illustrated in FIG. 2, a body outer panel 33 and a wheel house reinforcement 34 are joined with an outer side surface in the width direction of the vehicle of the wheel house outer 32. The body outer panel 33, together with the wheel house outer 32, forms a closed cross-section in a longitudinal section along the width direction of the vehicle.

More specifically, as illustrated in FIG. 2, the wheel house outer 32 in the longitudinal section along the width direction of the vehicle includes an outer flange 32a, an outer body 32b, and an outer edge 32c, which are integrally formed. The outer flange 32a is vertically formed toward the upper side of the vehicle. The outer body 32b extends toward the outside in the width direction of the vehicle and slightly toward a lower side of the vehicle from a lower end of the outer flange 32a. The outer edge 32c extends toward the lower side of the vehicle and slightly toward the outside in the width direction of the vehicle from an edge on the outside in the width direction of the vehicle of the outer body 32b.

As illustrated in FIG. 2, an inner side surface in the width direction of the vehicle of the outer flange 32a is joined with an inner flange 31a of the wheel house inner 31. The inner flange 31a is vertically formed toward the upper side of the vehicle.

As illustrated in FIG. 2, the body outer panel 33 in the longitudinal section along the width direction of the vehicle includes an upper side flange 33a, a panel body 33b, and a lower side flange 33c, which are integrally formed. The upper side flange 33a is joined with the outer flange 32a of the wheel house outer 32. The panel body 33b extends toward the outside in the width direction of the vehicle and toward the lower side of the vehicle from a lower end of the upper side flange 33a and has a substantial stair-shape. The lower side flange 33c is joined with the outer edge 32c of the wheel house outer 32.

As illustrated in FIG. 2, the wheel house reinforcement 34 is inside the closed cross-section between the wheel house outer 32 and the body outer panel 33 in the longitudinal section along the width direction of the vehicle.

More specifically, as illustrated in FIG. 2, the wheel house reinforcement 34 in the longitudinal section along the width direction of the vehicle includes an upper side flange 34a, a reinforcement body 34b, and a lower side flange 34c, which are integrally formed. The upper side flange 34a is joined with the outer flange 32a of the wheel house outer 32 on a lower side of the vehicle than the upper side flange 33a of the body outer panel 33. The reinforcement body 34b extends toward the outside in the width direction of the vehicle and toward the lower side of the vehicle from a lower end of the upper side flange 34a. The lower side flange 34c extends toward the outside in the width direction of the vehicle from a lower end of the reinforcement body 34b. The lower side flange 34c is joined with the outer body 32b of the wheel house outer 32 (illustration of joining omitted).

The front wheel house cover 4 is made of polypropylene relatively low in rigidity. As illustrated in FIG. 1 and FIG. 2, the front wheel house cover 4 covers a front part of the wheel house 3 from a lower side of the vehicle and has a substantial dome-shape which protrudes toward the upper side of the vehicle.

The rear wheel house cover 5 is made of polypropylene relatively low in rigidity. As illustrated in FIG. 1, the rear wheel house cover 5 covers a rear part of the wheel house 3 from the lower side of the vehicle and has the substantial dome-shape which protrudes toward the upper side of the vehicle.

As illustrated in FIG. 1, a lower edge of the side door 6 substantially overlaps the wheel arch 60. The wheel arch 60 is the cutout, which corresponds to the outer circumferential shape of the rear wheel 2, on the side part of the vehicle and has the substantially arc-shaped side view. A front part of the side door 6 is configured to operably couple to an automobile body openably by door hinges (illustration omitted).

As illustrated in FIG. 2, the side door 6 includes a door inner panel 61, a door outer panel 62, and a door garnish 63. The door inner panel 61 is on the inside in the width direction of the vehicle. The door outer panel 62 is closer to the outside in the width direction of the vehicle than the door inner panel 61. The door garnish 63 is made of synthetic resin and is connected with the door outer panel 62.

More specifically, as illustrated in FIG. 2, the door inner panel 61 in the longitudinal section along the width direction of the vehicle includes a door inner wall 61*a*, a door bottom surface 61*b*, and a door inner lower edge 61*c*, which are integrally formed. The door inner wall 61*a* faces the outer flange 32*a* of the wheel house outer 32 in the width direction of the vehicle with the body outer panel 33 sandwiched in a space. The door bottom surface 61*b* faces the outer body 32*b* of the wheel house outer 32 on the upper side of the vehicle with the body outer panel 33 sandwiched in the space. The door inner lower edge 61*c* faces the outer edge 32*c* of the wheel house outer 32 on the outside in the width direction of the vehicle with the body outer panel 33 sandwiched in the space.

As illustrated in FIG. 2, the door bottom surface 61*b* of the door inner panel 61 extends toward the outside in the width direction of the vehicle and toward the lower side of the vehicle from a lower end of the door inner wall 61*a* and has a substantial stair-shape.

As illustrated in FIG. 2, the door inner lower edge 61*c* of the door inner panel 61 is sized in an upper and lower direction such that a lower end of the door inner lower edge 61*c* is on an upper part of the outer edge 32*c* of the wheel house outer 32.

The door outer panel 62 is a panel member as a design surface of the side door 6. As illustrated in FIG. 2, the door outer panel 62 includes a door outer wall 62*a*, a garnish fitting part 62*b*, and a door outer lower edge 62*c*, which are integrally formed. The door outer wall 62*a* is on the outside in the width direction of the vehicle and is the design surface of the side door 6. The garnish fitting part 62*b* is on the lower side of the vehicle relative to the door outer wall 62*a*, and the door garnish 63 is fit on the garnish fitting part 62*b*. The door outer lower edge 62*c* is connected with the door inner panel 61.

More specifically, as illustrated in FIG. 2, the garnish fitting part 62*b* in the longitudinal section along the width direction of the vehicle extends toward the inside in the width direction of the vehicle and toward the lower side of the vehicle from the lower end of the door outer wall 62*a*, and further toward the lower side of the vehicle.

As illustrated in FIG. 2, the door outer lower edge 62*c* is formed by elongating the lower end of the garnish fitting part 62*b* toward the lower side of the vehicle. As illustrated in FIG. 2, the door outer lower edge 62*c* is connected with the door inner lower edge 61*c* of the door inner panel 61 by hemming.

As illustrated in FIG. 1 and FIG. 2, the door garnish 63 is a design surface on a lower part of the side door 6, and is made of synthetic resin. The door garnish 63 includes a rectangular part and an arc part, which are unified with each other. The rectangular part extends in a front and rear direction of the vehicle along the side sill 7 and has a substantially rectangular-shaped side view. The arc part extends along the wheel arch 60 and has a substantially arc-shaped side view.

As illustrated in FIG. 1, a lower end of the rectangular part in side view along the side sill 7 is on the upper side of the vehicle relative to the lower end of the side sill 7 and forms an edge substantially in parallel with the lower end of the side sill 7. A lower end of the arc part along the wheel arch 60 forms the wheel arch 60.

As illustrated in FIG. 2, the door garnish 63 includes an outer garnish 631 and an inner garnish 632. The outer garnish 631, together with the door outer panel 62, forms the design surface on the outside in the width direction of the vehicle of the side door 6. The inner garnish 632, together with the door inner panel 61, forms the design surface on the inside in the width direction of the vehicle of the side door 6.

More specifically, as illustrated in FIG. 2, the outer garnish 631 in the longitudinal section along the width direction of the vehicle includes a garnish outer wall 631*a* and a garnish bottom part 631*b* integrally formed with the garnish outer wall 631*a*. The garnish outer wall 631*a* is substantially on the same position as the door outer wall 62*a* of the door outer panel 62 in the width direction of the vehicle. The garnish bottom part 631*b* extends toward the inside in the width direction of the vehicle from a lower end of the garnish outer wall 631*a*.

As illustrated in FIG. 2, a point fastener 10 connects and fixes the outer garnish 631 on the garnish fitting part 62*b*.

As illustrated in FIG. 2, the inner garnish 632 in the longitudinal section along the width direction of the vehicle includes a garnish inner wall 632*a* and an inner extension 632*b*, which are integrally formed. The garnish inner wall 632*a* is substantially on the same position as a part connected by hemming of the door outer lower edge 62*c* of the door outer panel 62 with the door inner lower edge 61*c* of the door inner panel 61 in the width direction of the vehicle. The inner extension 632*b* is formed by extending an upper end of the garnish inner wall 632*a* toward a space between the garnish fitting part 62*b* of the door outer panel 62 and the outer garnish 631.

As illustrated in FIG. 2, the garnish inner wall 632*a* in the longitudinal section along the width direction of the vehicle faces the outer edge 32*c* of the wheel house outer 32 with an interval in the width direction of the vehicle. A second seal member 21 (to be described below) makes contact with a surface of the garnish inner wall 632*a*, which faces the outer edge 32*c*, as a contact surface.

As illustrated in FIG. 1, a fender garnish 81 is fit on the rear fender 8 along the wheel arch 60. The fender garnish 81 has the substantially arc-shaped side view continuous with the door garnish 63 of the side door 6.

A first seal member 11 configured to close a space between the body outer panel 33 and the side door 6 and the second seal member 21 configured to close a space between the wheel house 3 and the side door 6 will be described.

As illustrated in FIG. 2, the first seal member 11 in the longitudinal section along the width direction of the vehicle seals a space between a corner on the panel body 33*b* of the body outer panel 33 and a corner on the door bottom surface 61*b* of the door inner panel 61.

The first seal member 11 is made of synthetic rubber having elasticity. As illustrated in FIG. 2, the first seal member 11 includes a seal part 11*a*. The seal part 11*a* has a substantially circular-shaped cross section and is configured to make contact with the body outer panel 33. The first seal member 11 is fit and fixed on the door inner panel 61 of the side door 6.

As illustrated in FIG. 2, when the side door 6 is in the closed position, the seal part 11a of the first seal member 11 elastically deforms to close the space between the body outer panel 33 and the door inner panel 61.

As illustrated in FIG. 2, the second seal member 21 in the longitudinal section along the width direction of the vehicle seals a space between the outer edge 32c of the wheel house outer 32 and the door garnish 63. The second seal member 21 is made of synthetic rubber having elasticity and is fit on a part of the outer edge 32c of the wheel house outer 32, which corresponds to a distance between the fender garnish 81 and the side sill 7.

More specifically, as illustrated in FIG. 3 and FIG. 4, the second seal member 21 in the longitudinal section along the width direction of the vehicle includes an installation base member 22 and a lip 23 integrally formed with the installation base member 22. The installation base member 22 is configured to operably couple to the outer edge 32c of the wheel house outer 32 and has a substantially U-shaped cross section. The lip 23 extends toward the outside in width direction of the vehicle, that is toward the door garnish 63, from the installation base member 22, and has a substantially tongue-shaped cross section.

The installation base member 22 and the lip 23 of the second seal member 21 will be described under the condition that a radial direction approaching the center of the rear wheel 2 is an inner side 35 in a radial direction and a radial direction away from the center of the rear wheel 2 is an outer side 30 in the radial direction.

As illustrated in FIG. 3 and FIG. 4, the installation base member 22 in the longitudinal section along the width direction of the vehicle is fittable along the outer edge 32c of the wheel house outer 32 and the lower side flange 33c of the body outer panel 33 from the inner side 35 in the radial direction toward the outer side 30 in the radial direction. The outer edge 32c and the lower side flange 33c are joined with each other.

As illustrated in FIG. 3 and FIG. 4, the installation base member 22 in the longitudinal section along the width direction of the vehicle has the substantially U-shaped cross section of which outer side 30 in the radial direction is open. The installation base member 22 is formed by covering a core metal 24, which has a substantially U-shaped cross section of which outer side 30 in the radial direction is open, with synthetic rubber having determined elasticity.

More specifically, as illustrated in FIG. 3 and FIG. 4, the installation base member 22 in the longitudinal section along the width direction of the vehicle includes an inner-cabin side wall 221, an outer-cabin side wall 222, and a connection wall 223. The inner-cabin side wall 221 and the outer-cabin side wall 222 face with each other with a joined part of the outer edge 32c and the lower side flange 33c sandwiched. The connection wall 223 connects a lower end of the inner-cabin side wall 221 and a lower end of the outer-cabin side wall 222 along the width direction of the vehicle.

As illustrated in FIG. 3 and FIG. 4, the inner-cabin side wall 221 is closer to the inside in the width direction of the vehicle than the outer edge 32c of the wheel house outer 32 and is at an interval from the outer edge 32c of the wheel house outer 32. The inner-cabin side wall 221 includes two protrusions 221a. The two protrusions 221a extend toward the outside in the width direction of the vehicle and make contact with the outer edge 32c.

As illustrated in FIG. 3 and FIG. 4, the outer-cabin side wall 222 is closer to the outside in the width direction of the vehicle than the lower side flange 33c of the body outer panel 33 and is at an interval from the lower side flange 33c of the body outer panel 33. The outer-cabin side wall 222 includes two protrusions 222a and a protrusion 222b, which extend toward the inside in the width direction of the vehicle. The two protrusions 222a and the protrusion 222b make contact with the lower side flange 33c and the outer edge 32c of the wheel house outer 32, respectively.

As illustrated in FIG. 3 and FIG. 4, a top end on the outer side 30 in the radial direction of the outer-cabin side wall 222 makes contact with the body outer panel 33 when fit on the joined part of the outer edge 32c of the wheel house outer 32 and the lower side flange 33c of the body outer panel 33.

As illustrated in FIG. 3, the connection wall 223 connects the inner-cabin side wall 221 and the outer-cabin side wall 222 along the width direction of the vehicle on a position substantially the same as a top end 40 of a lip 23 (to be described later) when the side door 6 is in the opened position. More specifically, the connection wall 223 is on the outer side 30 in the radial direction relative to the top end 40 of the lip 23.

As illustrated in FIG. 3 and FIG. 4, a corner in the longitudinal section along the width direction of the vehicle between the inner-cabin side wall 221 and the connection wall 223 has an inside chamfering 22a which has a substantially gentle arc-shape.

As illustrated in FIG. 3 and FIG. 4, a corner in the longitudinal section along the width direction of the vehicle between the outer-cabin side wall 222 and a connection wall 223 has an outside chamfering 22b which has a substantially gentle arc-shape. As illustrated in FIG. 3, the outside chamfering 22b substantially faces the top end 40 of the lip 23 (to be described later) in the width direction of the vehicle when the side door 6 is in the opened position.

As illustrated in FIG. 3 and FIG. 4, the lip 23 in the longitudinal section along the width direction of the vehicle has a substantially tongue-shaped cross section which has a substantial V-shape with a lip intermediate part 50 as an apex of the substantial V-shape.

The lip intermediate part 50 makes contact with the inner garnish 632 of the door garnish 63.

More specifically, as illustrated in FIG. 3 and FIG. 4, the lip 23 in the longitudinal section along the width direction of the vehicle includes a body 231 and an extension 232 and has the substantially tongue-shaped cross section which has the substantial V-shape. The body 231 extends toward the outside in the width direction of the vehicle and toward the inner side 35 in the radial direction from a part on the outer side 30 in the radial direction of the outer-cabin side wall 222 of the installation base member 22. The extension 232 extends toward the inside in the width direction of the vehicle and slightly toward the inner side 35 in the radial direction from the lip intermediate part 50 as the top end of the body 231.

In other words, the body 231 of the lip 23 extends from the part on the outer side 30 in the radial direction of the installation base member 22 relative to the lip intermediate part 50 which makes contact with the door garnish 63. The extension 232 of the lip 23 extends toward the installation base member 22 from the lip intermediate part 50.

As illustrated in FIG. 3, the body 231 has the substantially arc-shaped cross section and gently protrudes toward the outside in the width direction of the vehicle from the installation base member 22 and toward the outer side 30 in the radial direction with the lip intermediate part 50 as a starting point when the side door 6 is in the opened position.

As illustrated in FIG. 3, the extension 232 has the substantially arc-shaped cross section and slightly protrudes toward the outside in the width direction of the vehicle with the top end 40 as a starting point and gently toward the inner side 35 in the radial direction with the lip intermediate part 50 as the starting point when the side door 6 is in the opened position. The extension 232 extends toward the outside chamfering 22*b* from the body 231, and a top end 40 of the extension 232 is a free end.

As illustrated in FIG. 3 and FIG. 4, length of the extension 232 is sized such that the top end 40 is at an interval from the connection wall 223 of the installation base member 22 when the side door 6 is in the opened position, and the top end 40 touches the connection wall 223 when the side door 6 is in the closed position.

As illustrated in FIG. 3 and FIG. 4, the lip 23 has a first synthetic rubber layer 23*a* and a second synthetic rubber layer 23*b* piled on the first synthetic rubber layer 23*a* in the width direction of the vehicle. The first synthetic rubber layer 23*a* and the second synthetic rubber layer 23*b* are different from each other in rigidity. This configuration differentiates the rigidity of a part of the extension 232 closer to the inside in the width direction of the vehicle (23*b*) from the rigidity of a part of the extension 232 closer to the outside in the width direction of the vehicle (23*a*) as well as the body 231 close to the lip intermediate part 50.

More specifically, as illustrated in FIG. 3 and FIG. 4, the lip 23 in the longitudinal section along the width direction of the vehicle includes the first synthetic rubber layer 23*a* and the second synthetic rubber layer 23*b* piled on the inside in the width direction of the vehicle of the first synthetic rubber layer 23*a*. The first synthetic rubber layer 23*a* forms the lip intermediate part 50, which makes contact the door garnish 63.

The first synthetic rubber layer 23*a* is lower in rigidity than the installation base member 22. As illustrated in FIG. 3 and FIG. 4, the first synthetic rubber layer 23*a* includes a first part and a second part. The first part is on the outside in the width direction of the vehicle and faces the door garnish 63. The first part is between the top end 40 of the extension 232 and a part close to a base of the lip 23, in other words a part close to a border between the installation base member 22 and the lip 23. The second part is between the part close to the base of the lip 23 and a substantial center of the body 231. The second part is on the inside in the width direction of the vehicle and faces the installation base member 22.

The second synthetic rubber layer 23*b* is higher in rigidity than the first synthetic rubber layer 23*a*, and has substantially the same rigidity as the installation base member 22. As illustrated in FIG. 3 and FIG. 4, the second synthetic rubber layer 23*b* is between the substantial center of the body 231 and the top end 40 of the extension 232. The second synthetic rubber layer 23*b* is on the inside in the width direction of the vehicle and faces the installation base member 22.

As illustrated in FIG. 3 and FIG. 4, the second synthetic rubber layer 23*b* in the longitudinal section along the width direction of the vehicle is increased in thickness as compared with the first synthetic rubber layer 23*a* which is on the outside in the width direction of the vehicle and adjacent to the second synthetic rubber layer 23*b*.

Referring to FIG. 3 to FIG. 5, elastic deformation of the lip 23 of the above-structured second seal member 21 will be simply described.

As illustrated in FIG. 3 and FIG. 5 with solid line, when the side door 6 is in the closed position, the top end 40 of the extension 232 of the lip 23 is at an interval from the installation base member 22.

As the side door 6 approaches the closed position and the door garnish 63 begins to touch the lip intermediate part 50, as illustrated in FIG. 5, the body 231 begins the elastic deformation. Specifically, the body 231 rotates toward the inside in the width direction of the vehicle with the part close to the base of the lip 23 as a cardinal point.

The door garnish 63 continues to press the part close to the lip intermediate part 50 as the apex of the substantially V-shaped cross section of the lip 23 of the second seal member 21 regardless of the opening/closing angle of the side door 6. In addition, the second synthetic rubber layer 23*b* increases the rigidity around the lip intermediate part 50 compared with the rigidity around the base of the lip 23, and the top end 40 of the extension 232 is the free end. As illustrated in FIG. 3 to FIG. 5, this configuration keeps an angle 110 between the body 231 and the extension 232 substantially stable while the lip 23 of the second seal member 21 elastically deforms.

With this configuration, as illustrated in FIG. 5, the extension 232 of the second seal member 21 is displaced to rotate toward the inside in the width direction of the vehicle with the part close to the base of the lip 23 as the center of rotation. Once the top end 40 of the extension 232 touches the installation base member 22, the extension 232 of the second seal member 21 is displaced, being guided by the outside chamfering 22*b* on the installation base member 22.

When the side door 6 is in the closed position, as illustrated by the two dot chain line in FIG. 4 and FIG. 5, the top end 40 of the extension 232 touches the connection wall 223 of the installation base member 22. Also, the extension 232 is displaced to face the base of the lip 23 on the inner side 35 in the radial direction and closes an opening between the body 231 and the installation base member 22. This configuration is the completion of the elastic deformation.

The side part structure according to the embodiment of the present invention of the vehicle 1 includes the side door 6 and the second seal member 21. The side door 6 is configured to operably couple to the automobile body openably, and includes the lower end edge which substantially overlaps the wheel arch 60. The wheel arch 60 is the cutout which corresponds to the outer circumferential shape of the rear wheel 2. The second seal member 21 is configured to seal a gap between the wheel house 3 and the side door 6.

The wheel house 3 is configured to cover the rear wheel 2. The side door 6 includes the door garnish 63 which faces the outer edge 32*c* of the wheel house 3 in the width direction of the vehicle. The second seal member 21 includes the installation base member 22 and the lip 23 integrally formed with the installation base member 22. The installation base member 22 is configured to operably couple to the outer edge 32*c* of the wheel house 3. The lip 23 has elasticity, has the substantially tongue-shaped cross section in the width direction of the vehicle, and makes contact with the door garnish 63. Under the condition that the radial direction away from center of the rear wheel 2 is the outer side 30 in the radial direction, the lip 23 in cross section along the width direction of the vehicle extends toward the door garnish 63 on the outside in the width direction of the vehicle from the part on the outer side 30 in the radial direction of the installation base member 22. As compared with a lip which extends from the part on the inner side 35 in the radial direction of the installation base member 22, this configuration elongates the distance between the center of the rear wheel 2 and the base of the lip 23.

In other words, the base of the lip 23 of the side part structure according to the embodiment of the present invention of the vehicle 1 is further from the center of the rear wheel 2 than the lip which extends from the part on the inner side 35 in the radial direction of the installation base member 22.

The side part structure according to the embodiment of the present invention of the vehicle 1 prevents ice and snow flung up by the rear wheel 2 from reaching the part close to the base of the lip 23, and controls accumulation on the part close to the base of the lip 23.

Even in case the side door 6 is closed powerfully, this configuration does not allow the ice and snow on the part close to the base of the lip 23 to press the door garnish 63 toward the outside in the width direction of the vehicle.

The side part structure according to the embodiment of the present invention of the vehicle 1 controls accumulation of the ice and snow on the second seal member 21 configured to operably couple to the outer edge 32*c* of the wheel house 3. Accordingly, the side part structure according to the embodiment of the present invention of the vehicle 1 prevents degradation in appearance of the side surface of the vehicle caused by deformation of the door garnish 63 rising from the side door 6 and damage on the door garnish 63.

In addition, the lip 23 of the second seal member 21 includes the body 231 and the extension 232 integrally formed with the body 231. The body 231 extends from the part on the outer side 30 in the radial direction of the installation base member 22 relative to the lip intermediate part 50 which makes contact with the door garnish 63. The extension 232 extends toward the installation base member 22 from the lip intermediate part 50. The top end 40 of the extension 232 touches the installation base member 22 when the side door 6 is in the closed position. With this embodiment of the present invention, the extension 232 of the lip 23 closes the opening between the installation base member 22 and the body 231 of the lip 23 when the side door 6 is in the closed position.

With this configuration, the extension 232 of the lip 23 prevents ice and snow flung up by the rear wheel 2 from entering the space between installation base member 22 and the body 231 of the lip 23.

In addition, with this configuration, since ice and snow does not hamper the elastic deformation of the body 231, the extension 232 of the second seal member 21 is stably displaced when the side door 6 is opened and closed. This configuration allows ice and snow adhering to the extension 232 of the lip 23 to easily peel off by opening and closing the side door 6.

Accordingly, the side part structure according to the embodiment of the present invention of the vehicle 1, with the extension 232 added to the lip 23, further controls accumulation of ice and snow on the second seal member 21 configured to operably couple to the outer edge 32*c* of the wheel house 3. The extension 232 extends from the lip intermediate part 50 which makes contact with the door garnish 63.

In addition, the lip 23 of the second seal member 21 has the substantially tongue-shaped cross section which has the substantial V-shape with the lip intermediate part 50 as the apex of the substantial V-shape when the side door 6 is in the opened position. This configuration certainly controls accumulation of ice and snow on the second seal member 21 configured to operably couple to the outer edge 32*c* of the wheel house 3.

More specifically, in case the lip 23 of the second seal member 21 in cross section along the width direction of the vehicle has the substantially tongue-shaped cross section which has a substantial arc-shape and protrudes toward the door garnish 63, a position of contact of the lip 23 with the door garnish 63 easily shifts owing to the change in the opening/closing angle of the side door 6.

With this configuration, a position of the extension 232 of the lip 23 relative to the installation base member 22 is unstable when the side door 6 is in the closed position. Also, with this configuration, the extension 232 of the lip 23 does not necessarily close the opening between the installation base member 22 and the body 231 of the lip 23 when the side door 6 is in the closed position.

On the other hand, the lip 23 of the second seal member 21 in cross section along the width direction of the vehicle has the substantially tongue-shaped cross section which has the substantial V-shape with the lip intermediate part 50 as the apex of the substantial V-shape. The apex of the lip 23 having the substantial V-shape stably makes contact with the door garnish 63 regardless of the change in the opening/closing angle of the side door 6.

With this configuration, as a pressing load of the door garnish 63 acts on the lip 23 of the second seal member 21, the extension 232 of the lip 23 is displaced to rotate toward the inside in the width direction of the vehicle with the part close to the base of the lip 23 in cross section along the width direction of the vehicle as the center of rotation.

With this configuration, the position of the extension 232 relative to the installation base member 22 is stable when the side door 6 is in the closed position. Accordingly, the extension 232 of the lip 23 certainly closes the opening between the installation base member 22 and the body 231 of the lip 23.

The side part structure according to the embodiment of the present invention of the vehicle 1, with the lip 23 of the second seal member 21 in cross section having the substantially tongue-shaped cross section which has the substantial V-shape, certainly controls accumulation of ice and snow on the second seal member 21 configured to operably couple to the outer edge 32*c* of the wheel house 3.

In addition, the lip 23 of the second seal member 21 in cross section along the width direction of the vehicle includes the first synthetic rubber layer 23*a* and the second synthetic rubber layer 23*b* integrally formed with the first synthetic rubber layer 23*a*. The first synthetic rubber layer 23*a* makes contact with the door garnish 63. The second synthetic rubber layer 23*b* is closer to the inside in the width direction of the vehicle than the first synthetic rubber layer 23*a* and is higher in rigidity than the first synthetic rubber layer 23*a*. The second synthetic rubber layer 23*b* extends between the part of the body 231 of the lip 23 close to the lip intermediate part 50 and the extension 232. With this configuration, the second synthetic rubber layer 23*b* controls change in the position of the extension 232 of the lip 23 relative to the body 231.

As the pressing load of the door garnish 63 acts on the lip 23 of the second seal member 21, the extension 232 of the lip 23 is displaced while keeping the angle 110 between the body 231 and the extension 232 in cross section along the width direction of the vehicle substantially stable.

With this configuration, the position of the extension 232 relative to the installation base member 22 is stable when the side door 6 is in the closed position. Accordingly, the extension 232 of the lip 23 certainly closes the opening between the installation base member 22 and the body 231 of the lip 23.

The side part structure according to the embodiment of the present invention of the vehicle 1, with the lip of the seal member having the second synthetic rubber layer 23b which is higher in rigidity than the first synthetic rubber layer 23a on the inside in the width direction relative to the first synthetic rubber layer 23a, certainly controls accumulation of ice and snow on the second seal member 21 configured to operably couple to the outer edge 32c of the wheel house 3.

In addition, the part of the installation base member 22 of the second seal member 21 has the outside chamfering 22b which has the substantial arc-shape. The part substantially faces the top end 40 of the extension 232 of the lip 23 in the width direction of the vehicle when the side door 6 is the opened position. When the extension 232 of the lip 23 touches the installation base member 22, the extension 232 of the lip 23 is displaced along the outside chamfering 22b on the installation base member 22.

This configuration prevents the extension 232 of the lip 23 from deforming into the undesired shape when the extension 232 of the lip 23 makes contact with the installation base member 22. This configuration controls accumulation of ice and snow on the extension 232 deformed into the undesired shape.

In addition, since the extension 232 of the lip 23 is displaced along the outside chamfering 22b on the installation base member 22, the extension 232 of the lip 23 fully touches the installation base member 22 without a space. Accordingly, the extension 232 of the lip 23 certainly closes the opening between the installation base member 22 and the body 231 of the lip 23.

The side part structure according to the embodiment of the present invention of the vehicle 1, with the outside chamfering 22b on the installation base member 22, further controls accumulation of ice and snow on the second seal member 21 configured to operably couple to the outer edge 32c of the wheel house 3. Also, the side part structure according to the embodiment of the present invention of the vehicle 1 certainly prevents degradation in appearance of the side surface of the vehicle and damage on the door garnish 63.

The seal member as a constituent of the present invention corresponds to the second seal member 21 of the embodiment. In the same manner, the edge of the wheel house corresponds to the outer edge 32c of the wheel house 3, the first lip layer corresponds to the first synthetic rubber layer 23a, the second lip layer corresponds to the second synthetic rubber layer 23b, the chamfering corresponds to the outside chamfering 22b. But this should not be construed in a limiting sense, and the present invention includes possible embodiments.

For example, while in this embodiment the second seal member 21 is made of synthetic rubber, the second seal member may be made of synthetic resin as long as the second seal member has elasticity and closes the space between the wheel house 3 and the side door 6. In this case, in the same manner as the first synthetic rubber layer 23a and the second synthetic rubber layer 23b of the lip 23, the lip may include two layers made of synthetic resin different from each other in rigidity.

In addition, while in this embodiment the top end 40 of the extension 232 of second seal member 21 in cross section is at the interval from the connection wall 223 of the installation base member 22 when the side door 6 is in the opened position, this should not be construed in a limiting sense. The top end 40, which is the free end, of the extension 232 of second seal member 21 in cross section may be adjacent to the installation base member 22 when the side door 6 is in the opened position as long as the top end 40 of the extension 232 in cross section touches or is adjacent to the connection wall 223 of the installation base member 22 when the side door 6 is in the closed position.

In addition, while in this embodiment the lip 23 of the second seal member 21 in the longitudinal section along the width direction of the vehicle has the substantially V-shaped cross section with the lip intermediate part 50 as the apex of the substantial V-shape, this should not be construed in a limiting sense. Another possible embodiment is that the lip 23 in the longitudinal section along the width direction of the vehicle has a substantially U-shaped cross section including a connecting wall as well as one side wall longer than the other side wall, and a substantially C-shaped cross section.

In addition, while in this embodiment the extension 232 of the second seal member 21 touches the installation base member 22 when the side door 6 is in the closed position, this should not be construed in a limiting sense. Another possible embodiment is that the extension 232 of the lip 23 is adjacent to the connection wall 223 of the installation base member 22 to close the opening between the body 231 of the lip 23 and the installation base member 22.

We claim:

1. A side part structure of a vehicle comprising:
a side door configured to operably couple to an automobile body openably, the side door including a lower end edge, the lower end edge substantially overlapping a wheel arch, the wheel arch being a cutout, the cutout corresponding to an outer circumferential shape of a rear wheel, the side door including a door garnish, the door garnish facing an edge of a wheel house in a width direction of the vehicle, the wheel house being configured to cover the rear wheel; and
a seal member configured to seal a gap between the wheel house and the side door, the seal member including:
an installation base member configured to operably couple to the edge of the wheel house; and
a cantilevered lip integrally formed with the installation base member, the lip having elasticity, the lip having a substantially tongue-shaped cross section in the width direction of the vehicle, the lip making contact with the door garnish, and under a condition that a radial direction away from a center of the rear wheel is an outer side in the radial direction, the lip in cross section along the width direction of the vehicle extends toward the door garnish on an outside in the width direction of the vehicle from a part on the outer side in the radial direction of the installation base member.

2. The side part structure of the vehicle as claimed in claim 1, wherein the lip of the seal member includes:
a body which extends from the part on the outer side in the radial direction of the installation base member relative to a lip intermediate part, the lip intermediate part being configured to make contact with the door garnish; and
an extension integrally formed with the body, the extension extending toward the installation base member from the lip intermediate part, a top end of the extension touching or being adjacent to the installation base member when the side door is in a closed position.

3. The side part structure of the vehicle as claimed in claim 2, wherein the tongue-shaped cross section has a substantial V-shape with the lip intermediate part as an apex of the substantial V-shape when the side door is in an opened position.

4. The side part structure of the vehicle as claimed in claim 2, wherein the lip of the seal member in cross section along the width direction of the vehicle includes:
- a first lip layer configured to make contact with the door garnish; and
- a second lip layer integrally formed with the first lip layer, the second lip layer being closer to an inside in the width direction of the vehicle than the first lip layer, the second lip layer being higher in rigidity than the first lip layer, the second lip layer extending between a part of the body of the lip close to the lip intermediate part and the extension.

5. The side part structure of the vehicle as claimed in claim 2, wherein a part of the installation base member of the seal member has a chamfering formed thereon, the chamfering having a substantial arc-shape, the part substantially facing the top end of the extension of the lip in the width direction of the vehicle when the side door is in the opened position.

6. The side part structure of the vehicle as claimed in claim 3, wherein the lip of the seal member in cross section along the width direction of the vehicle includes:
- a first lip layer configured to make contact with the door garnish; and
- a second lip layer integrally formed with the first lip layer, the second lip layer being closer to an inside in the width direction of the vehicle than the first lip layer, the second lip layer being higher in rigidity than the first lip layer, the second lip layer extending between a part of the body of the lip close to the lip intermediate part and the extension.

7. The side part structure of the vehicle as claimed in claim 3, wherein a part of the installation base member of the seal member has a chamfering formed thereon, the chamfering having a substantial arc-shape, the part substantially facing the top end of the extension of the lip in the width direction of the vehicle when the side door is in the opened position.

8. The side part structure of the vehicle as claimed in claim 4, wherein a part of the installation base member of the seal member has a chamfering formed thereon, the chamfering having a substantial arc-shape, the part substantially facing the top end of the extension of the lip in the width direction of the vehicle when the side door is in the opened position.

9. The side part structure of the vehicle as claimed in claim 6, wherein a part of the installation base member of the seal member has a chamfering formed thereon, the chamfering having a substantial arc-shape, the part substantially facing the top end of the extension of the lip in the width direction of the vehicle when the side door is in the opened position.

* * * * *